(12) United States Patent
Xiao et al.

(10) Patent No.: US 11,663,115 B2
(45) Date of Patent: *May 30, 2023

(54) GENERATION OF MICROSERVICES FROM A MONOLITHIC APPLICATION BASED ON RUNTIME TRACES

(71) Applicant: INTERNATIONAL BUSINESS MACHINES CORPORATION, Armonk, NY (US)

(72) Inventors: Jin Xiao, White Plains, NY (US); Anup Kalia, White Plains, NY (US); Chen Lin, Elmsford, NY (US); Raghav Batta, Ossining, NY (US); Saurabh Sinha, Danbury, CT (US); John Rofrano, Mahopac, NY (US); Maja Vukovic, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/500,299

(22) Filed: Oct. 13, 2021

(65) Prior Publication Data
US 2022/0035732 A1    Feb. 3, 2022

Related U.S. Application Data

(63) Continuation of application No. 16/855,565, filed on Apr. 22, 2020, now Pat. No. 11,176,027.

(51) Int. Cl.
*G06F 11/36* (2006.01)
*G06F 11/32* (2006.01)

(52) U.S. Cl.
CPC ........ *G06F 11/3688* (2013.01); *G06F 11/323* (2013.01); *G06F 11/3636* (2013.01); *G06F 11/3684* (2013.01); *G06F 11/3692* (2013.01)

(58) Field of Classification Search
USPC ........................................................ 717/124
See application file for complete search history.

(56) References Cited

U.S. PATENT DOCUMENTS 7,996,413 B2    8/2011    Cotichini et al.
8,831,964 B2    9/2014    Cotichini
(Continued)

FOREIGN PATENT DOCUMENTS

CN    109714358 A    5/2019
WO    2007/129224 A3    4/2008

OTHER PUBLICATIONS

International Search report and Written Opinion received for PCT application No. PCT/IB2021/052424 dated Jun. 24, 2021, 9 pages.
Non Final office action received for U.S. Appl. No. 16/855,565 dated Apr. 30, 2021, 30 pages.
(Continued)

*Primary Examiner* — Qing Chen
*Assistant Examiner* — Clint Thatcher
(74) *Attorney, Agent, or Firm* — Amin, Turocy & Watson, LLP

(57) ABSTRACT

Systems, computer-implemented methods, and computer program products to facilitate generation of microservices from a monolithic application based on runtime traces are provided. According to an embodiment, a system can comprise a memory that stores computer executable components and a processor that executes the computer executable components stored in the memory. The computer executable components can comprise a model component that learns cluster assignments of classes in a monolithic application based on runtime traces of executed test cases. The computer executable components can further comprise a cluster component that employs the model component to generate clusters of the classes based on the cluster assignments to identify one or more microservices of the monolithic application.

20 Claims, 10 Drawing Sheets

(56) References Cited

U.S. PATENT DOCUMENTS

| | | |
|---|---|---|
| 8,843,909 B2 | 9/2014 | Tondreau et al. |
| 8,930,919 B2 | 1/2015 | Bhaskara et al. |
| 9,055,002 B2 | 6/2015 | Lategan |
| 10,496,935 B2 | 12/2019 | Sachdev et al. |
| 10,503,631 B1 | 12/2019 | Talluri et al. |
| 10,644,970 B2 | 5/2020 | Vinnakota et al. |
| 2007/0067756 A1 | 3/2007 | Garza |
| 2009/0037483 A1 | 2/2009 | Christensen |
| 2018/0107466 A1 | 4/2018 | Rihani et al. |
| 2018/0113799 A1 | 4/2018 | M.V. et al. |
| 2019/0108067 A1 | 4/2019 | Ishikawa et al. |
| 2019/0212992 A1 | 7/2019 | Jonnadula et al. |
| 2019/0312800 A1 | 10/2019 | Schibler et al. |
| 2019/0334789 A1 | 10/2019 | Roche et al. |
| 2019/0392329 A1 | 12/2019 | Rangarajan et al. |
| 2020/0019388 A1 | 1/2020 | Jaeger et al. |
| 2020/0348921 A1 | 11/2020 | Marechal et al. |
| 2021/0232485 A1* | 7/2021 | Agarwal ............ G06F 11/3419 |

OTHER PUBLICATIONS

Ponce et al., "Migrating from Monolithic Architecture to Microservices: A Rapid Review", 38th International Conference of the Chilean Computer Science Society (SCCC), 2019, pp. 1-7.

Selmadji et al., "From Monolithic Architecture Style to Microservice one Based on a Semi-Automatic Approach," IEEE International Conference on Software Architecture (ICSA), 2020, pp. 157-168.

Jin et al., "Functionality-Oriented Microservice Extraction Based on Execution Trace Clustering," 2018 IEEE International Conference on Web Services {ICWS), 2018, 8 pages.

Perri et al., "Higher-Order Visualization of Causal Structures in Dynamics Graphs," arXiv:1908.05976v1 [cs.SI], Aug. 16, 2019, 21 pages.

Jin et al., Abstract for "Service Candidate Identification from Monolithic Systems based on Execution Traces," Service Candidate Identification from Monolithic Systems based on Execution Traces, Apr. 11, 2019, 1 page.

Mell et al., "The NIST Definition of Cloud Computing," Recommendations of the National Institute of Standards and Technology, NIST Special Publication 800-145, Sep. 2011, 7 pages.

List of IBM Patents or Applications Treated as Related, [Oct. 19, 2021].

* cited by examiner

GENERATION OF MICROSERVICES FROM A MONOLITHIC APPLICATION BASED ON RUNTIME TRACES

BACKGROUND

The subject disclosure relates to generation of microservices from a monolithic application, and more specifically, to generation of microservices from a monolithic application based on runtime traces.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, devices, computer-implemented methods, and/or computer program products that facilitate generation of microservices from a monolithic application based on runtime traces are described.

According to an embodiment, a system can comprise a memory that stores computer executable components and a processor that executes the computer executable components stored in the memory. The computer executable components can comprise a model component that learns cluster assignments of classes in a monolithic application based on runtime traces of executed test cases. The computer executable components can further comprise a cluster component that employs the model component to generate clusters of the classes based on the cluster assignments to identify one or more microservices of the monolithic application. An advantage of such a system is that it can facilitate improved functional grouping (e.g., functional clustering) of the classes to enable more accurate identification of the one or more microservices and improved application modernization of the monolithic application.

In some embodiments, the executed test cases comprise business function test cases that provide business functionalities of the monolithic application in the runtime traces. An advantage of such a system is that it can facilitate improved functional grouping (e.g., functional clustering) of the classes to enable more accurate identification of the one or more microservices and improved application modernization of the monolithic application.

According to another embodiment, a computer-implemented method can comprise training, by a system operatively coupled to a processor, a model to learn cluster assignments of classes in a monolithic application based on runtime traces of executed test cases. The computer-implemented method can further comprise employing, by the system, the model to generate clusters of the classes based on the cluster assignments to identify one or more microservices of the monolithic application. An advantage of such a computer-implemented method is that it can be implemented to facilitate improved functional grouping (e.g., functional clustering) of the classes to enable more accurate identification of the one or more microservices and improved application modernization of the monolithic application.

In some embodiments, the executed test cases comprise business function test cases that provide business functionalities of the monolithic application in the runtime traces. An advantage of such a computer-implemented method is that it can be implemented to facilitate improved functional grouping (e.g., functional clustering) of the classes to enable more accurate identification of the one or more microservices and improved application modernization of the monolithic application.

According to another embodiment, a computer program product facilitating a process to generate microservices from a monolith application based on runtime traces is provided. The computer program product comprising a computer readable storage medium having program instructions embodied therewith, the program instructions executable by a processor to cause the processor to train, by the processor, a model to learn cluster assignments of classes in a monolithic application based on runtime traces of executed test cases. The program instructions are further executable by the processor to cause the processor to employ, by the processor, the model to generate clusters of the classes based on the cluster assignments to identify one or more microservices of the monolithic application. An advantage of such a computer program product is that it can be implemented to facilitate improved functional grouping (e.g., functional clustering) of the classes to enable more accurate identification of the one or more microservices and improved application modernization of the monolithic application.

In some embodiments, the executed test cases comprise business function test cases that provide business functionalities of the monolithic application in the runtime traces. An advantage of such a computer program product is that it can be implemented to facilitate improved functional grouping (e.g., functional clustering) of the classes to enable more accurate identification of the one or more microservices and improved application modernization of the monolithic application.

According to an embodiment, a system can comprise a memory that stores computer executable components and a processor that executes the computer executable components stored in the memory. The computer executable components can comprise a collection component that collects runtime traces of test cases executed on a monolithic application. The computer executable components can further comprise a model component that learns cluster assignments of classes in the monolithic application based on the runtime traces. The computer executable components can further comprise a cluster component that employs the model component to generate clusters of the classes based on the cluster assignments to identify one or more microservices of the monolithic application. An advantage of such a system is that it can facilitate improved functional grouping (e.g., functional clustering) of the classes to enable more accurate identification of the one or more microservices and improved application modernization of the monolithic application.

In some embodiments, the test cases comprise business function test cases that provide business functionalities of the monolithic application in the runtime traces. An advantage of such a system is that it can facilitate improved functional grouping (e.g., functional clustering) of the classes to enable more accurate identification of the one or more microservices and improved application modernization of the monolithic application.

According to another embodiment, a computer-implemented method can comprise collecting, by a system operatively coupled to a processor, runtime traces of test cases executed on a monolithic application. The computer-implemented method can further comprise training, by the system, a model to learn cluster assignments of classes in the monolithic application based on the runtime traces. The computer-implemented method can further comprise employing, by the system, the model to generate clusters of the classes based on the cluster assignments to identify one or more microservices of the monolithic application. An advantage of such a computer-implemented method is that it can be implemented to facilitate improved functional grouping (e.g., functional clustering) of the classes to enable more accurate identification of the one or more microservices and improved application modernization of the monolithic application.

In some embodiments, the test cases comprise business function test cases that provide business functionalities of the monolithic application in the runtime traces. An advantage of such a computer-implemented method is that it can be implemented to facilitate improved functional grouping (e.g., functional clustering) of the classes to enable more accurate identification of the one or more microservices and improved application modernization of the monolithic application.

DETAILED DESCRIPTION

Figure 1:
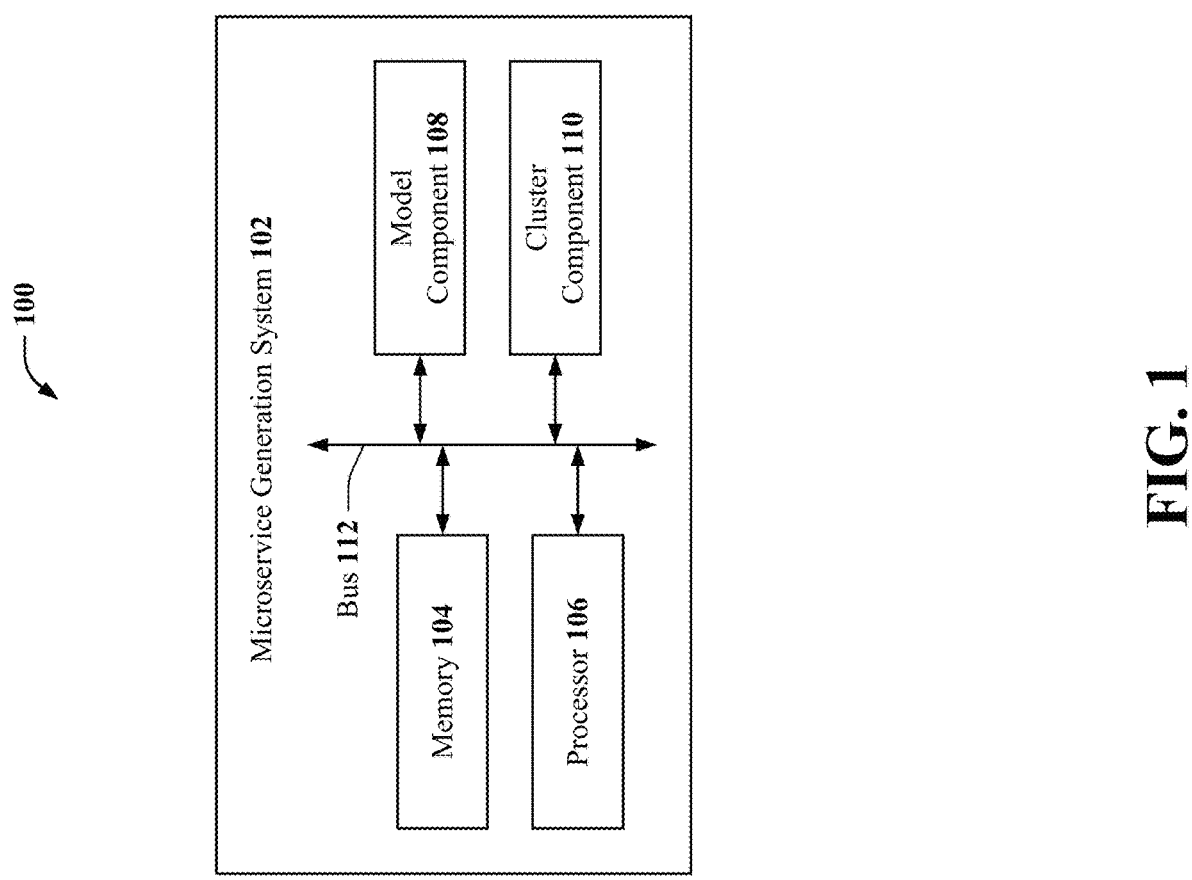
FIG. 1 illustrates a block diagram of an example, non-limiting system that can facilitate generation of microservices from a monolithic application based on runtime traces in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Application modernization is the process of refactoring a monolith application (also referred to as a monolithic application) into standalone microservices. The traditional monolith enterprise application is designed with complex and intertwining presentation, business process, and data models. They are difficult to maintain and change. A microservice is a loosely coupled standalone application encapsulating a small set of functionalities and interacts with other applications through a publicly described interface. Therefore, they are much easier to be updated, scaled, maintained and deployed to a cloud computing environment.

Some existing application modernization technologies apply a static code analysis-based approach to generate microservices from a monolithic application. Such a static code analysis-based approach analyzes source which provides a comprehensive view of the call relations. A problem with such a static code analysis-based approach is that it does not capture the call relations and interaction frequencies under specific workloads and inputs.

Some existing application modernization technologies apply a meta-data-based approach to generate microservices from a monolithic application. Such a meta-data-based approach relies on design documents such as, for example, data-flow diagrams, software artifacts, code base change history, and/or another design document. A problem with such a meta-data-based approach is that the design documents defined above are not always available and accessible.

Some existing application modernization technologies apply a dynamic microservice composition-based approach to generate microservices from a monolithic application. Such a dynamic microservice composition-based approach utilizes operational data and produces dynamically adapting microservice models during runtime. A problem with such a dynamic microservice composition-based approach is that the operational data is difficult to collect.

Some existing application modernization technologies apply a workload-data-based approach to generate microservices from a monolithic application. Such a workload-data-based approach uses operational data (e.g., log file) and produces fixed microservice models after data collection. A problem with such a workload-data-based approach is that the operational data is difficult to collect.

Some existing application modernization technologies apply an approach that utilizes runtime traces to learn class groupings by implementing the following steps: 1) all classes are assigned to different clusters; 2) the Jaccard Similarity Coefficient for each pair of clusters is computed, where clusters with maximum Jaccard Similarities are merged; and 3) the Genetic algorithm is applied to refine the results according to some optimization objective (e.g., maximize intra-connectivity and minimize inter-connectivity). A problem with such an approach is that it does not consider the business contexts which is essential in creating groupings of classes with good business function cohesion. Another problem with such an approach is that it does not consider high order temporal dependency. Another problem with such an approach is that it aggregates the run traces into a graph, and therefore loses rich temporal information and assumes erroneous transitive relations. Another problem with such an approach is that it does not directly minimize call volume and minimize business context to improve cluster quality.

Given the problems described above with existing application modernization technologies, the present disclosure can be implemented to produce a solution to these problems in the form of systems, computer-implemented methods, and/or computer program products that can train a model to learn cluster assignments and/or graph embeddings of classes in a monolithic application based on runtime traces of test cases that can be executed using the monolithic application; and/or employ the model to generate clusters of the classes based on the cluster assignments and/or graph embeddings to identify one or more microservices of the monolithic application. An advantage of such systems, computer-implemented methods, and/or computer program products is that they can be implemented to facilitate improved functional grouping (e.g., functional clustering) of the classes to enable more accurate identification of the one or more microservices and improved application modernization of the monolithic application. In some embodiments, the test cases can comprise business function test cases that provide business functionalities of the monolithic application in the runtime traces. An advantage of such systems, computer-implemented methods, and/or computer program products is that they can be implemented to facilitate improved functional grouping (e.g., functional clustering) of the classes to enable more accurate identification of the one or more microservices and improved application modernization of the monolithic application.

FIG. 1 illustrates a block diagram of an example, non-limiting system 100 that can facilitate generation of microservices from a monolithic application based on runtime traces in accordance with one or more embodiments described herein. System 100 can comprise a microservice generation system 102, which can be associated with a cloud computing environment. For example, microservice generation system 102 can be associated with cloud computing environment 950 described below with reference to FIG. 9 and/or one or more functional abstraction layers described below with reference to FIG. 10 (e.g., hardware and software layer 1060, virtualization layer 1070, management layer 1080, and/or workloads layer 1090).

Microservice generation system 102 and/or components thereof (e.g., model component 108, cluster component 110, collection component 202, second model component 204, refinement component 206, etc.) can employ one or more computing resources of cloud computing environment 950 described below with reference to FIG. 9 and/or one or more functional abstraction layers (e.g., quantum software, etc.) described below with reference to FIG. 10 to execute one or more operations in accordance with one or more embodiments of the subject disclosure described herein. For example, cloud computing environment 950 and/or such one or more functional abstraction layers can comprise one or more classical computing devices (e.g., classical computer, classical processor, virtual machine, server, etc.), quantum hardware, and/or quantum software (e.g., quantum computing device, quantum computer, quantum processor, quantum circuit simulation software, superconducting circuit, etc.) that can be employed by microservice generation system 102 and/or components thereof to execute one or more operations in accordance with one or more embodiments of the subject disclosure described herein. For instance, microservice generation system 102 and/or components thereof can employ such one or more classical and/or quantum computing resources to execute one or more classical and/or quantum: mathematical function, calculation, and/or equation; computing and/or processing script; algorithm; model (e.g., artificial intelligence (AI) model, machine learning (ML) model, etc.); and/or another operation in accordance with one or more embodiments of the subject disclosure described herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Microservice generation system 102 can comprise a memory 104, a processor 106, a model component 108, a cluster component 110, and/or a bus 112.

It should be appreciated that the embodiments of the subject disclosure depicted in various figures disclosed herein are for illustration only, and as such, the architecture of such embodiments are not limited to the systems, devices, and/or components depicted therein. For example, in some embodiments, system 100 and/or microservice generation system 102 can further comprise various computer and/or computing-based elements described herein with reference to operating environment 800 and FIG. 8. In several embodiments, such computer and/or computing-based elements can be used in connection with implementing one or more of the systems, devices, components, and/or computer-implemented operations shown and described in connection with FIG. 1 or other figures disclosed herein.

Memory 104 can store one or more computer and/or machine readable, writable, and/or executable components and/or instructions that, when executed by processor 106 (e.g., a classical processor, a quantum processor, etc.), can facilitate performance of operations defined by the executable component(s) and/or instruction(s). For example, memory 104 can store computer and/or machine readable, writable, and/or executable components and/or instructions that, when executed by processor 106, can facilitate execution of the various functions described herein relating to microservice generation system 102, model component 108, cluster component 110, and/or another component associated with microservice generation system 102 (e.g., collection component 202, second model component 204, refinement component 206, etc.) as described herein with or without reference to the various figures of the subject disclosure.

Memory 104 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 104 are described below with reference to system memory 816 and FIG. 8. Such examples of memory 104 can be employed to implement any embodiments of the subject disclosure.

Processor 106 can comprise one or more types of processors and/or electronic circuitry (e.g., a classical processor, a quantum processor, etc.) that can implement one or more computer and/or machine readable, writable, and/or executable components and/or instructions that can be stored on memory 104. For example, processor 106 can perform various operations that can be specified by such computer and/or machine readable, writable, and/or executable components and/or instructions including, but not limited to, logic, control, input/output (I/O), arithmetic, and/or the like. In some embodiments, processor 106 can comprise one or more central processing unit, multi-core processor, microprocessor, dual microprocessors, microcontroller, System on a Chip (SOC), array processor, vector processor, quantum processor, and/or another type of processor. Further examples of processor 106 are described below with reference to processing unit 814 and FIG. 8. Such examples of processor 106 can be employed to implement any embodiments of the subject disclosure.

Microservice generation system 102, memory 104, processor 106, model component 108, cluster component 110, and/or another component of microservice generation system 102 as described herein (e.g., collection component 202, second model component 204, refinement component 206, etc.) can be communicatively, electrically, operatively, and/or optically coupled to one another via a bus 112 to perform functions of system 100, microservice generation system 102, and/or any components coupled therewith. Bus 112 can comprise one or more memory bus, memory controller, peripheral bus, external bus, local bus, a quantum bus, and/or another type of bus that can employ various bus architectures. Further examples of bus 112 are described below with reference to system bus 818 and FIG. 8. Such examples of bus 112 can be employed to implement any embodiments of the subject disclosure.

Microservice generation system 102 can comprise any type of component, machine, device, facility, apparatus, and/or instrument that comprises a processor and/or can be capable of effective and/or operative communication with a wired and/or wireless network. All such embodiments are envisioned. For example, microservice generation system 102 can comprise a server device, a computing device, a general-purpose computer, a special-purpose computer, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players, and/or another type of device.

Microservice generation system 102 can be coupled (e.g., communicatively, electrically, operatively, optically, etc.) to one or more external systems, sources, and/or devices (e.g., classical and/or quantum computing devices, communication devices, etc.) via a data cable (e.g., High-Definition Multimedia Interface (HDMI), recommended standard (RS) 232, Ethernet cable, etc.). In some embodiments, microservice generation system 102 can be coupled (e.g., communicatively, electrically, operatively, optically, etc.) to one or more external systems, sources, and/or devices (e.g., classical and/or quantum computing devices, communication devices, etc.) via a network.

In some embodiments, such a network can comprise wired and wireless networks, including, but not limited to, a cellular network, a wide area network (WAN) (e.g., the Internet) or a local area network (LAN). For example, microservice generation system 102 can communicate with one or more external systems, sources, and/or devices, for instance, computing devices (and vice versa) using virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. In such an example, microservice generation system 102 can thus include hardware (e.g., a central processing unit (CPU), a transceiver, a decoder, quantum hardware, a quantum processor, etc.), software (e.g., a set of threads, a set of processes, software in execution, quantum pulse schedule, quantum circuit, quantum gates, etc.) or a combination of hardware and software that facilitates communicating information between microservice generation system 102 and external systems, sources, and/or devices (e.g., computing devices, communication devices, etc.).

Microservice generation system 102 can comprise one or more computer and/or machine readable, writable, and/or executable components and/or instructions that, when executed by processor 106 (e.g., a classical processor, a quantum processor, etc.), can facilitate performance of operations defined by such component(s) and/or instruction(s). Further, in numerous embodiments, any component associated with microservice generation system 102, as described herein with or without reference to the various figures of the subject disclosure, can comprise one or more computer and/or machine readable, writable, and/or executable components and/or instructions that, when executed by processor 106, can facilitate performance of operations defined by such component(s) and/or instruction(s). For example, model component 108, cluster component 110, and/or any other components associated with microservice generation system 102 as disclosed herein (e.g., communicatively, electronically, operatively, and/or optically coupled with and/or employed by microservice generation system 102), can comprise such computer and/or machine readable, writable, and/or executable component(s) and/or instruction(s). Consequently, according to numerous embodiments, microservice generation system 102 and/or any components associated therewith as disclosed herein, can employ processor 106 to execute such computer and/or machine readable, writable, and/or executable component(s) and/or instruction(s) to facilitate performance of one or more operations described herein with reference to microservice generation system 102 and/or any such components associated therewith.

Microservice generation system 102 can facilitate (e.g., via processor 106) performance of operations executed by and/or associated with model component 108, cluster component 110, and/or another component associated with microservice generation system 102 as disclosed herein (e.g., collection component 202, second model component 204, refinement component 206, etc.). For example, as described in detail below, microservice generation system 102 can facilitate via processor 106 (e.g., a classical processor, a quantum processor, etc.): training a model to learn cluster assignments of classes in a monolithic application based on runtime traces of executed test cases; and/or employing the model to generate clusters of the classes based on the cluster assignments to identify one or more microservices of the monolithic application. As referenced herein, a cluster can be defined as a group of classes that can be grouped together by microservice generation system 102 and/or one or more components thereof as described herein (e.g., model component 108, cluster component 110, collection component 202, second model component 204, refinement component 206, etc.) based on one or more defined objectives (e.g., business context, call volume, etc.). More specifically, in the applied domain of monolith to microservice refactoring (also referred to as application modernization), as referenced herein, a cluster can be defined as a group of classes that can be composed into a microservice.

In the above example, as described in detail below, microservice generation system 102 can further facilitate via processor 106 (e.g., a classical processor, a quantum processor, etc.): refining the one or more microservices based on at least one of data dependency of the monolithic application or a static call graph of the monolithic application; generating one or more causal graphs based on the runtime traces of the executed test cases to capture at least one of first order temporal dependencies or high order temporal dependencies of at least one of the monolithic application or the cluster assignments of the classes in the monolithic application; and/or training the model to learn at least one of the cluster assignments or graph embeddings of the classes in the monolithic application using causal sequences of one or more causal graphs generated based on the runtime traces of the executed test cases. In the above example, the executed test cases can comprise business function test cases that provide business functionalities of the monolithic application in the runtime traces.

In another example, as described in detail below, microservice generation system 102 can further facilitate via processor 106 (e.g., a classical processor, a quantum processor, etc.): collecting runtime traces of test cases executed on a monolithic application; training a model to learn cluster assignments of classes in the monolithic application based on the runtime traces; and/or employing the model to generate clusters of the classes based on the cluster assignments to identify one or more microservices of the monolithic application. In this example, as described in detail below, microservice generation system 102 can further facilitate via processor 106 (e.g., a classical processor, a quantum processor, etc.): refining the one or more microservices based on at least one of data dependency of the monolithic application or a static call graph of the monolithic application; generating one or more causal graphs based on the runtime traces to capture at least one of first order temporal dependencies or high order temporal dependencies of at least one of the monolithic application or the cluster assignments of the classes in the monolithic application; and/or training the model to learn at least one of the cluster assignments or graph embeddings of the classes in the monolithic application using causal sequences of one or more causal graphs generated based on the runtime traces. In this example, the test cases can comprise business function test cases that provide business functionalities of the monolithic application in the runtime traces.

Model component 108 can learn cluster assignments of classes in a monolithic application based on runtime traces of executed test cases. For example, model component 108 can comprise an artificial intelligence (AI) and/or a machine learning (ML) model (e.g., a neural network) that can be trained (e.g., via microservice generation system 102 as described below) to learn cluster assignments of classes in a monolithic application (e.g., a monolith enterprise application) based on runtime traces that can be produced by employing the monolithic application to execute such test cases (e.g., via processor 106). In some embodiments, model component 108 can comprise model 400 described below and illustrated in FIG. 4, where model 400 can comprise a neural network that can be trained (e.g., via microservice generation system 102 as described below) to learn cluster assignments of classes in a monolithic application (e.g., a monolith enterprise application) based on runtime traces that can be produced by employing the monolithic application to execute such test cases (e.g., via processor 106).

In an example, the executed test cases described above can comprise business function test cases that can be executed using the monolithic application (e.g., run on the monolithic application via processor 106). In this example, such business function test cases can provide business functionalities of the monolithic application in the runtime traces. For instance, such business function test cases can provide microservice generation system 102 and/or model component 108 with the order and frequency of how classes and function calls of the monolithic application interact and can further enable microservice generation system 102 and/or model component 108 to associate business context with each trace to provide improved functional grouping (e.g., via microservice generation system 102, model component 108, and/or cluster component 110 as described below).

Model component 108 can learn cluster assignments of classes in the monolithic application and/or graph embeddings of such classes in the monolithic application using causal sequences of one or more causal graphs generated based on the runtime traces that can be produced by executing test cases on the monolithic application as described above. In an example, model component 108 can simultaneously learn such cluster assignments and graph embeddings described above using causal sequences of one or more causal graphs that can be generated (e.g., by second model component 204 as described below with reference to FIG. 2) based on the runtime traces described above. In this example, generation (e.g., by second model component 204) of such one or more causal graphs described above can provide microservice generation system 102 and/or model component 108 with: the first order temporal dependencies and/or the high order temporal dependencies of the monolithic application; and/or the cluster assignments of the classes in the monolithic application.

To facilitate such learning by model component 108 described above, microservice generation system 102 can train model component 108. For example, model component 108 can comprise an artificial intelligence (AI) and/or a machine learning (ML) model such as, for instance, a neural network (e.g., model 400) that can be trained by microservice generation system 102 to learn the cluster assignments and/or graph embeddings described above using the causal sequences of the one or more causal graphs described above. For instance, microservice generation system 102 can train model component 108 to learn the cluster assignments and/or graph embeddings described above by implementing the training procedure described below.

To illustrate the training procedure that microservice generation system 102 can implement to train model component 108 to learn the cluster assignments and/or graph embeddings described above, in an embodiment, the monolithic application described above can comprise an example Java 2 Platform Enterprise Edition (J2EE) application such as, for instance, an example trading application that can be employed to trade security assets in one or more financial marketplaces. In this embodiment, the example trading application can comprise a J2EE application for an online stock trading system that allows users to login, view their portfolio, lookup stock quotes, and/or buy and sell stock shares. In this embodiment, the runtime traces that can be produced by executing test cases (e.g., business function test cases) on the example trading application can comprise multi-threaded runtime traces that can represent a 3-tier architecture presentation layer, business logic, and persistence layer. In this embodiment, such runtime traces can be produced by executing on the example trading application (e.g., via processor 106) test cases (e.g., business function test cases) including, but not limited to, init, login, log-off, trade account, trade account update profile, market summary glossary, trade quotes buy, trade portfolio sell, and/or another test case. In this embodiment, a class and its call to other classes may involve multiple business contexts. In this embodiment, the runtime traces that can be produced by executing such test cases defined above on the example trading application can comprise the following runtime traces:

1567027540073,init,Root calls MarketSummarySingleton 1567027540074,init,MarketSummarySingleton calls Log 1567027540075,init,Log calls TradeConfig 1567027540076,init,TradeConfig returns to Log 1567027540077,init,Log calls TradeConfig 1567027540078,init,TradeConfig returns to Log 1567027540079,init,Log returns to MarketSummarySingleton

. . .

1567027743085,trade-quotes-buy,Root calls OrdersAlertFilter 1567027743086,trade-quotes-buy,OrdersAlertFilter calls TradeConfig 1567027743087,trade-quotes-buy,TradeConfig returns to OrdersAlertFilter Root-MarketSummarySingleton-Log-TradeConfig-(TradeConfig-Log)-log-MarketSummarySingleton init Root-OrdersAlertFilter-TradeConfig-(TradeConfig-OrdersAlertFilter)-OrdersAlertFilter trade-quotes-buy In this example embodiment, where the monolithic application comprises an example trading application, microservice generation system 102 can generate one or more causal graphs comprising causal sequences based on the runtime traces defined above. In this embodiment, microservice generation system 102 can generate such one or more causal graphs to capture first order temporal dependencies and/or high order temporal dependencies of the monolithic application and/or the cluster assignments of the classes in the monolithic application. In this embodiment, to facilitate generation of such one or more causal graphs, microservice generation system 102 can employ a second model component (e.g., second model component 204 described below with reference to FIG. 2) that can comprise a neural network, such as, for instance, a high-order temporal neural network to generate such causal graph(s) described above. In this embodiment, microservice generation system 102 can employ such a second model component (e.g., second model component 204 described below with reference to FIG. 2) to capture (e.g., via generation of the causal graphs comprising the causal sequences described above) the temporal relations of the paths and to extrapolate highly related call sequences.

In this example embodiment, where the monolithic application comprises an example trading application, microservice generation system 102 can train model component 108 to learn the cluster assignments and/or graph embeddings described above using as input the causal sequences (also referred to herein as runtime causal sequences and/or runtime sequences) of the one or more casual graphs described above, where the output can comprise node embedding (e.g., a mapping f: $V \rightarrow R^d$) and cluster assignment. In this embodiment, microservice generation system 102 can train model component 108 to directly sample the neighboring nodes from the runtime causal sequences. In this embodiment, given runtime sequences S, the collection of windows that contain node v can be denoted as $N_s(v)$. In this embodiment, microservice generation system 102 can train model component 108 to generate one or more positive sample pairs from causal sequences by implementing the following example routine:

Given the runtime sequence "Root, MarketSummarySingleton, Log, TradeConfig, TradeConfig returns to Log, Log" and an observation window of size 3.

The node "MarketSummarySingleton" has neighborhood window $N_s$(v=MarketSummary Singleton).

[Root, MarketSummary Singleton, Log]

[MarketSummary Singleton, Log, TradeConfig]

Extract positive sample pair:

(MarketSummarySingleton, Root)

(MarketSummary Singleton, Log)

(MarketSummary Singleton, TradeConfig)

Figure 4:
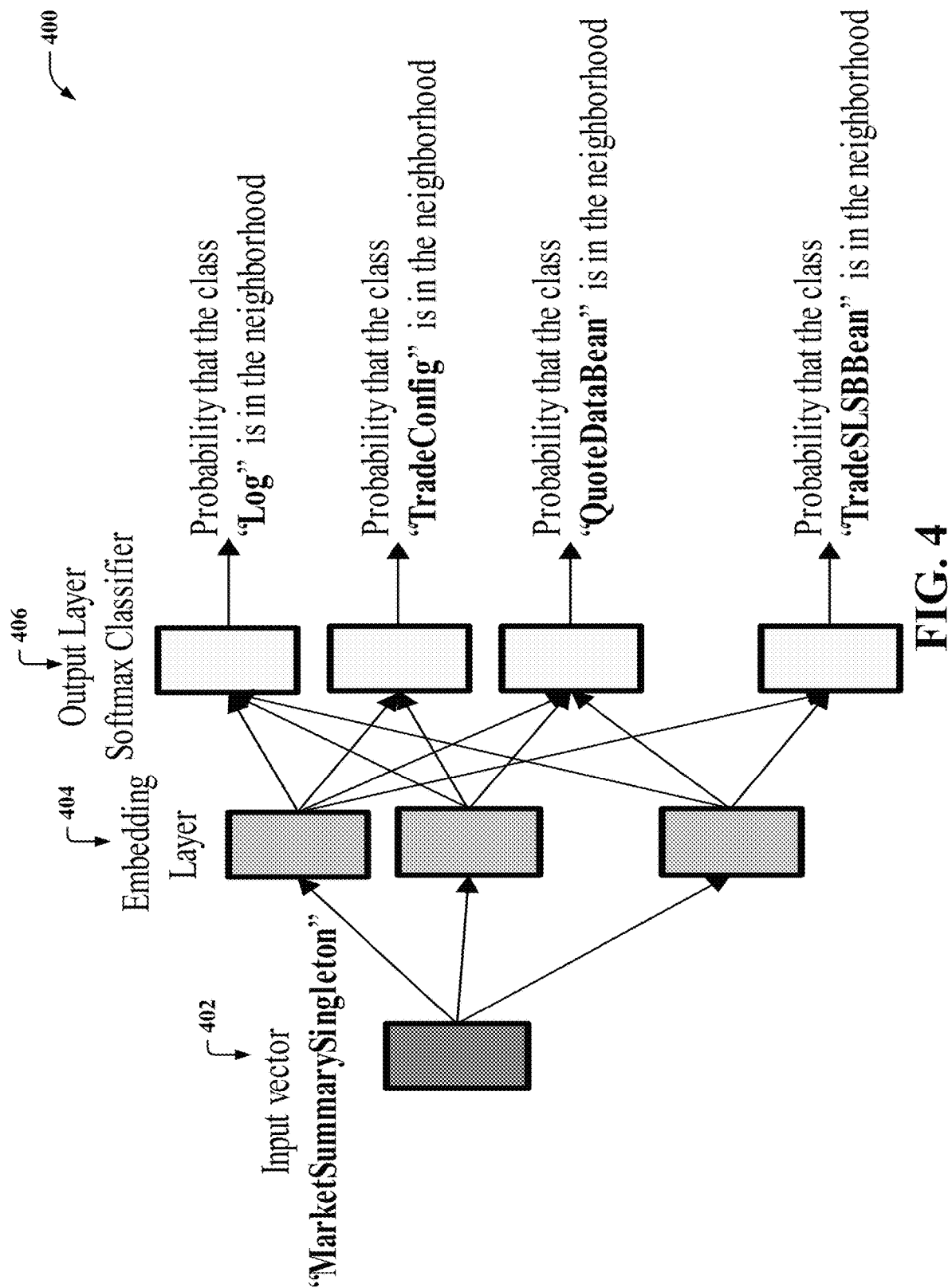
FIG. 4 illustrates a diagram of an example, non-limiting model that can facilitate generation of microservices from a monolithic application based on runtime traces in accordance with one or more embodiments described herein.

In this example embodiment, where the monolithic application comprises an example trading application, model component 108 can comprise a neural network such as, for instance, model 400 illustrated in FIG. 4. In this embodiment, microservice generation system 102 can train model component 108 (e.g., model 400) to learn the cluster assignments and/or graph embeddings described above by training model component 108 for the following task: given a specific class A in a runtime sequence, microservice generation system 102 can train model component 108 to predict the probability for every class of being the "neighboring" class of A in a runtime sequence. In this embodiment, if two Java classes have very similar "contexts," it can mean these two classes are likely to co-occur within the same context window under the same business context and microservice generation system 102 can train model component 108 to output similar embedding for these two classes. In this embodiment that utilizes sequence-based embedding, sequences of neighboring nodes can be sampled (e.g., via microservice generation system 102 and/or model component 108) from the causal graph(s) using a method such as, for instance, random walk and the objective can be to minimize the negative log likelihood of observing the neighborhoods of nodes.

In this example embodiment, where the monolithic application comprises an example trading application, microservice generation system 102 can train model component 108 to achieve the objective described above to minimize the negative log likelihood of observing these neighborhoods of node conditional on the node embedding by employing equation (1) defined below.

$$\min_f \sum_{v \in V} -\log P(N_s(i) | f(v)) \quad \text{Equation (1)}$$

where f(v) denotes the embedding for node v, P denotes the probability function, and $N_s(i)$ denotes a collection of neighboring nodes around node v.

In this example embodiment, where the monolithic application comprises an example trading application, according to conditional independence assumption and symmetry in the feature space, equation (1) defined above can be formulized by microservice generation system 102 and/or model component 108 as equation (2) defined below.

$$L_h = \min_f \sum_{v \in V} \left( \ln\left(\sum_{u \in V} \exp(f(v) * f(u)) - \sum n_i \in N_s(i)(f(ni) * f(v))\right) \right) \quad \text{Equation (2)}$$

where $L_h$ denotes the optimization function for embedding, u denotes a node u, f(u) denotes the embedding of node u, and $f(n_i)$ denotes the embedding for node $n_i$.

In this example embodiment, where the monolithic application comprises an example trading application, microservice generation system 102 can train model component 108 to learn the above described cluster assignments and/or graph embeddings simultaneously. For instance, to facilitate such simultaneous learning, microservice generation system 102 can train model component 108 to extend the objective function (e.g., equation (2)) to include the k-means cost function defined below as equation (3).

$$L_c = L_h + \gamma \cdot \sum_{u \in V} \min_{c \in C} \|f(v) - u_c\|^2 \quad \text{Equation (3)}$$

where $L_c$ denotes the overall optimization function for both embedding and clustering, γ denotes a hyperparameter determining the weight coefficient of the cluster cost, and $u_c$ denotes the cluster mean for $c^{th}$ cluster. Note that they are trainable parameters.

In some embodiments, microservice generation system 102 can comprise and/or employ one or more artificial intelligence (AI) models and/or one or more machine learning (ML) models to train model component 108 to learn the cluster assignments and/or graph embeddings described above using the causal sequences of the one or more causal graphs described above. For example, microservice generation system 102 can comprise and/or employ one or more AI and/or ML models to train model component 108 to learn the cluster assignments and/or graph embeddings described above using the causal sequences of the one or more causal graphs described above and using one or more unsupervised learning methods (e.g., an unsupervised clustering method such as, for instance, the training procedure described above).

In some embodiments, microservice generation system 102 can train model component 108 to learn the cluster assignments and/or graph embeddings described above using the causal sequences of the one or more causal graphs described above based on classifications, correlations, inferences and/or expressions associated with principles of artificial intelligence. For instance, microservice generation system 102 can employ an automatic classification system and/or an automatic classification process to train model component 108 to learn the cluster assignments and/or graph embeddings described above using the causal sequences of the one or more causal graphs described above. In one embodiment, microservice generation system 102 can employ a probabilistic and/or statistical-based analysis (e.g., factoring into the analysis utilities and costs) to train model component 108 to learn the cluster assignments and/or graph embeddings described above using the causal sequences of the one or more causal graphs described above.

In some embodiments, microservice generation system 102 can employ any suitable machine learning based techniques, statistical-based techniques, and/or probabilistic-based techniques to train model component 108 to learn the cluster assignments and/or graph embeddings described above using the causal sequences of the one or more causal graphs described above. For example, microservice generation system 102 can employ an expert system, fuzzy logic, support vector machine (SVM), Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, and/or another model. In some embodiments, microservice generation system 102 can perform a set of machine learning computations associated with training model component 108 to learn the cluster assignments and/or graph embeddings described above using the causal sequences of the one or more causal graphs described above. For example, microservice generation system 102 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations to train model component 108 to learn the cluster assignments and/or graph embeddings described above using the causal sequences of the one or more causal graphs described above.

Cluster component 110 can employ model component 108 to generate clusters of classes in a monolithic application based on cluster assignments in the monolithic application to identify one or more microservices of the monolithic application. For example, based on microservice generation system 102 training model component 108 to learn cluster assignments and/or graph embeddings of a monolithic application using causal sequences of one or more causal graphs as described above, cluster component 110 can employ the trained version of model component 108 to generate clusters of the classes in the monolithic application based on such cluster assignments and/or graph embeddings of the monolithic application that have been learned by model component 108. In this example, the clusters of the classes that can be generated by cluster component 110 as described above (e.g., via employing model component 108) can be indicative of one or more microservices of the monolithic application (e.g., one or more potential microservice candidates of the monolithic application) that can thereby be identified by cluster component 110 and/or further refined by refinement component 206 as described below with reference to FIG. 2.

Figure 2:
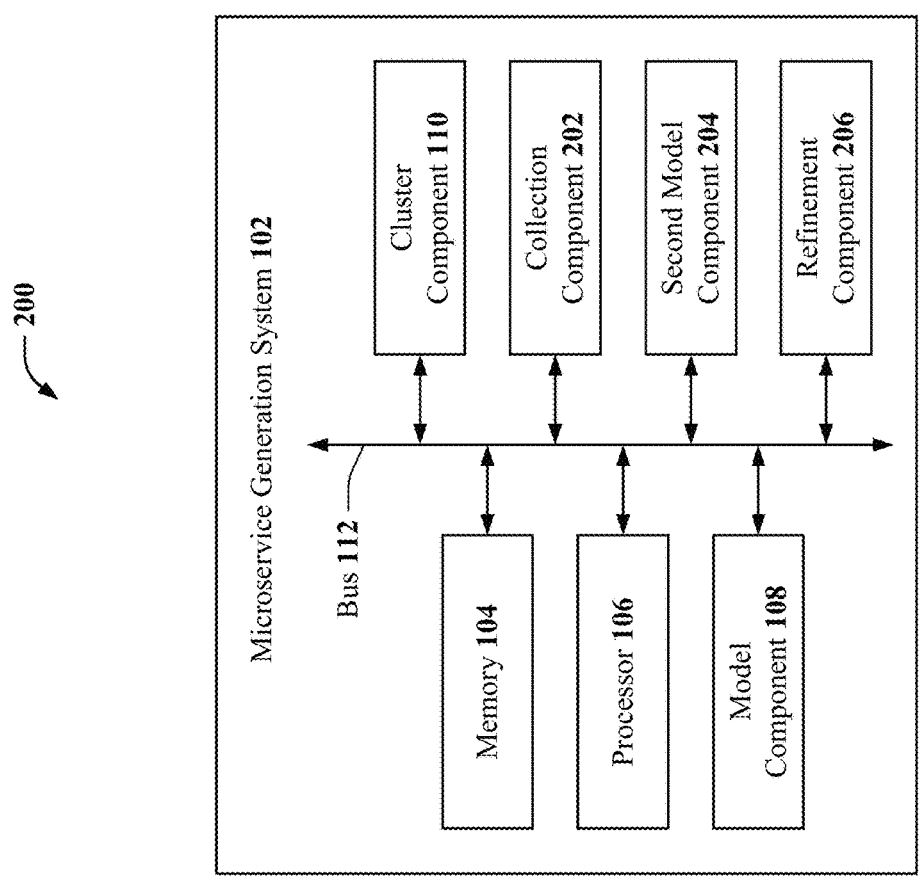
FIG. 2 illustrates a block diagram of an example, non-limiting system that can facilitate generation of microservices from a monolithic application based on runtime traces in accordance with one or more embodiments described herein.

FIG. 2 illustrates a block diagram of an example, non-limiting system 200 that can facilitate generation of microservices from a monolithic application based on runtime traces in accordance with one or more embodiments described herein. System 200 can comprise microservice generation system 102, which can further comprise a collection component 202, a second model component 204, and/or a refinement component 206. Repetitive description of like elements and/or processes employed in respective embodiments is omitted for sake of brevity.

Collection component 202 can collect runtime traces of test cases executed on a monolithic application. For example, collection component 202 can collect runtime traces that can be produced by executing (e.g., via processor 106) test cases using a monolithic application, where such test cases can comprise the business function test cases described above with reference to FIG. 1.

To facilitate collection of such runtime traces described above, collection component 202 can employ a machine learning (ML) model based on artificial intelligence (AI) and natural language processing (NLP) and/or named-entity recognition (NER), including, but not limited to, a shallow or deep neural network model, a support vector machine (SVM) model, a decision tree classifier, or any supervised or unsupervised machine learning model that can facilitate extraction of runtime traces produced by executing such test cases described above using a monolithic application. For example, collection component 202 can employ a monitoring application that can generate a runtime log from instrumented source code of a monolithic application. In another example, collection component 202 can employ a python-based tool to extract information from source code of a monolithic application such as, for instance, class name, attributes, method names, method arguments, return types, and/or other information, where such a python-based tool can further insert code into the monolithic application for runtime trace generation. In another example, collection component 202 can employ a Java front-end tool that enables generation of trace based on business context. In another example, collection component 202 can employ an extraction application that can extract inheritance relationships, data dependency, attributes, method argument, return type, and/or other relationships.

Second model component 204 can generate one or more causal graphs based on runtime traces of test cases executed on a monolithic application to capture first order temporal dependencies and/or high order temporal dependencies of the monolithic application and/or the cluster assignments of classes in the monolithic application. For example, second model component 204 can generate the one or more causal graphs described above with reference to FIG. 1 based on runtime traces produced by executing business function test cases on a monolithic application to capture first order temporal dependencies and/or high order temporal dependencies of the monolithic application and/or the cluster assignments of classes in the monolithic application.

Second model component 204 can comprise a neural network. In an example, second model component 204 can comprise a high-order temporal neural network that can generate one or more causal graphs comprising causal sequences based on the runtime traces defined above with reference to FIG. 1 to capture such first order temporal dependencies and/or high order temporal dependencies described above. For example, second model component 204 can comprise a high-order temporal neural network that can generate one or more causal graphs comprising causal sequences based on the runtime traces defined above with reference to FIG. 1 to capture the temporal relations of the paths and to extrapolate highly related call sequences. In an example, such causal graph(s) and/or causal sequences that can be generated by second model component 204 can be used by microservice generation system 102 to train model component 108 to learn the cluster assignments and/or graph embeddings of a monolithic application as described above with reference to FIG. 1.

Refinement component 206 can refine one or more microservices of a monolithic application based on (e.g., using) data dependency of the monolithic application and/or a static call graph of the monolithic application. For example, the clusters of classes that can be generated by cluster component 110 as described above (e.g., via employing model component 108) can be indicative of one or more microservices of the monolithic application (e.g., one or more potential microservice candidates of the monolithic application) that can be further refined by refinement component 206 as described below based on (e.g., using) data dependency of the monolithic application and/or a static call graph of the monolithic application.

In the example trading application embodiment described above with reference to FIG. 1, to facilitate refinement of such one or more microservices of a monolithic application based on (e.g., using) data dependency of the monolithic application and/or a static call graph of the monolithic application, refinement component 206 can augment the cost function (e.g., equation (3)) to add additional regularization terms. For instance, in the example trading application embodiment described above with reference to FIG. 1, refinement component 206 can augment the cost function (e.g., equation (3)) to add additional regularization terms, yielding equation (4) defined below. In the example trading application embodiment described above with reference to FIG. 1, refinement component 206 can utilize equation (4) defined below to refine one or more microservices of a monolithic application based on (e.g., using) data dependency of the monolithic application and/or a static call graph of the monolithic application, where such data dependency and/or static call graph can be collected by collection component 202 as described above (e.g., collected from the runtime traces produced by executing business function test cases using a monolithic application).

$$\lambda_2 * \sum_{(u,v) \in c2} \omega_{2(u,v)} * \|f(u) - f(v)\| \qquad \text{Equation (4)}$$

where $\omega_{(u,v)}$ denotes the regularization weight and $\lambda_i$ denotes the regularization coefficient (e.g., determining the severity of penalty).

In the example above, c2: u, v belongs to the different clusters but have run time call dependency and $\omega_{2(u,v)}$ calculates the normalized call frequency. In the example above, if two classes have frequent function call, then their representation should be close (e.g., inter-cluster call volume).

Figure 3:
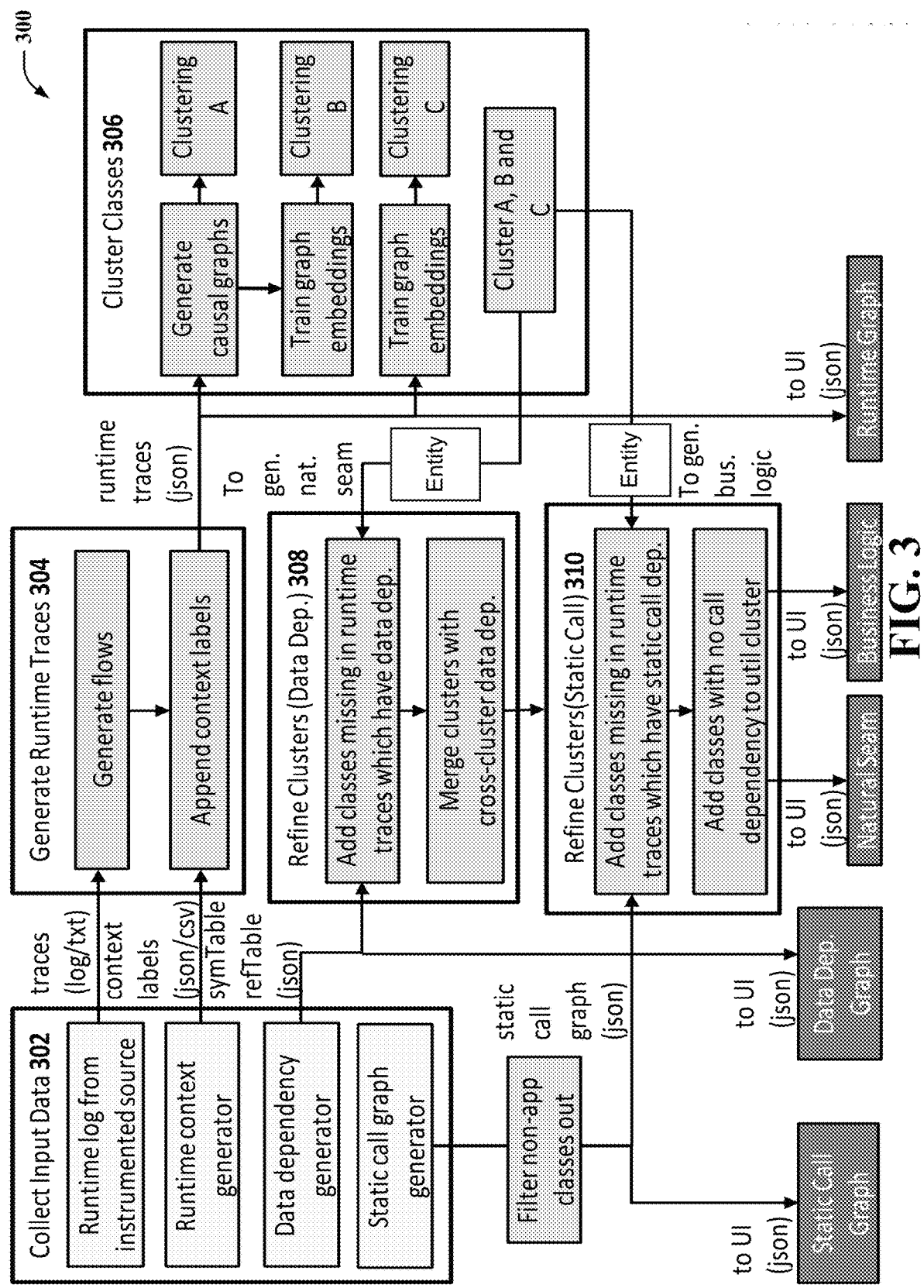
FIG. 3 illustrates a flow diagram of an example, non-limiting computer-implemented method that can facilitate generation of microservices from a monolithic application based on runtime traces in accordance with one or more embodiments described herein.

FIG. 3 illustrates a flow diagram of an example, non-limiting computer-implemented method 300 that can facilitate generation of microservices from a monolithic application based on runtime traces in accordance with one or more embodiments described herein. Repetitive description of like elements and/or processes employed in respective embodiments is omitted for sake of brevity.

At 302, computer-implemented method 300 can comprise collecting (e.g., via microservice generation system 102 and/or collection component 202) input data. For example, as described above with reference to FIG. 2, collection component 202 can collect runtime traces that can be produced by executing (e.g., via processor 106) test cases (e.g., business function test cases) using a monolithic application.

In an example, as illustrated in FIG. 3 at 302, collection component 202 can employ a monitoring application that can generate a runtime log from instrumented source code of a monolithic application. In this example, as illustrated in FIG. 3 at 302, such a monitoring application can generate the runtime log formatted as a log file and/or a text file.

In another example, as illustrated in FIG. 3 at 302, collection component 202 can employ runtime context generator such as, for instance, a Java front-end tool that can generate runtime context (e.g., business context). In this example, as illustrated in FIG. 3 at 302, such a runtime context generator can generate runtime context comprising context labels (e.g., business context labels) formatted as a JavaScript object notation (JSON) file and/or a comma-separated values (CSV) file. In this example, an entity (e.g., a human, a client, a user, a computing device, a software application, an agent, a machine learning (ML) model, an artificial intelligence (AI) model, etc.) implementing microservice generation system 102 can define such context labels (e.g., business context labels) using an interface component (not illustrated in the figures) of microservice generation system 102 (e.g., an application programming interface (API), a representational state transfer API, a graphical user interface (GUI), etc.).

In another example, as illustrated in FIG. 3 at 302, collection component 202 can employ a data dependency generator such as, for instance, a python-based tool to extract information from source code of a monolithic application that can be used to generate a data dependency graph, where such information can comprise class name, attributes, method names, method arguments, return types, and/or other information. In this example, as illustrated in FIG. 3 at 302, such a data dependency generator can generate a data dependency graph comprising a symbol table (denoted as symTable in FIG. 3) and/or a reference table (denoted as refTable in FIG. 3) that can be formatted as a JSON file.

In another example, as illustrated in FIG. 3 at 302, collection component 202 can employ a static call graph generator such as, for instance, an extraction application that can extract inheritance relationships, data dependency, attributes, method argument, return type, and/or other relationships to generate a static call graph. In this example, as illustrated in FIG. 3 at 302, such a static call graph generator can generate a static call graph formatted as a JSON file. In this example, as illustrated in FIG. 3 at 302, microservice generation system 102 and/or collection component 202 can filter non-application classes out of the static call graph, where such a filtered static call graph can be utilized to refine clusters of classes and/or can be provided to a user interface (UI) as described below.

At 304, computer-implemented method 300 can comprise generating (e.g., via microservice generation system 102 and/or second model component 204) runtime traces. For example, as illustrated in FIG. 3 at 304, based on collection of the runtime log from an instrumented source and/or generation of the runtime context (e.g., business context and/or business context labels) at 302 as described above, at 304, microservice generation system 102 and/or second model component 204 can generate flows (e.g., causal sequences, data flows, etc.) and append context labels to respective traces generated by executing the test cases (e.g., business function test cases) described above using the monolithic application, thereby yielding runtime traces that can be formatted as JSON file(s).

At 306, computer-implemented method 300 can comprise clustering (e.g., via microservice generation system 102, model component 108, cluster component 110, and/or second model component 204) classes of the monolithic application to generate clustering A, B, and/or C as depicted in FIG. 3. For example, to facilitate such clustering of the classes at 306, computer-implemented method 300 can comprise assigning (e.g., via microservice generation system 102, model component 108, cluster component 110, and/or second model component 204) clusters to the classes of the monolithic application to yield clustering A, B, and/or C as depicted in FIG. 3. For instance, as illustrated in FIG. 3 at 306, computer-implemented method 300 can comprise: a) generating and/or applying (e.g., via microservice generation system 102 and/or second model component 204) causal graphs to obtain temporal dependency, yielding clustering A; b) generating and/or applying (e.g., via microservice generation system 102, model component 108, and/or second model component 204) causal graphs to train model component 108 to learn the cluster assignments and/or graph embeddings of the monolithic application (e.g., as described above with reference to FIGS. 1 and 2) to obtain the partition of each class using the causal graphs, thereby yielding clustering B; and/or c) applying (e.g., via microservice generation system 102, model component 108, and/or cluster component 110) the runtime traces generated at 304 as described above to train model component 108 to learn the cluster assignments and/or graph embeddings of the monolithic application (e.g., as described above with reference to FIGS. 1 and 2) to obtain the partition of each class using the runtime traces, thereby yielding clustering C.

At 308, computer-implemented method 300 can comprise refining (e.g., via microservice generation system 102 and/or refinement component 206) clustering A, B, and/or C as depicted in FIG. 3 based on the data dependency graph generated at 302 as described above and using input from an entity (e.g., a human, a client, a user, a computing device, a software application, an agent, a machine learning (ML) model, an artificial intelligence (AI) model, etc.). For example, as illustrated in FIG. 3 at 308, refinement component 206 and/or the entity defined above can add classes (e.g., to clustering A, B, and/or C) that are missing in the runtime traces, where such classes have data dependency (e.g., data dependency with one or more classes in clustering A, B, and/or C as determined using the data dependency graph). In this example, as illustrated in FIG. 3 at 308, refinement component 206 and/or the entity defined above can further merge clusters (e.g., clustering A, B, and/or C) with cross-cluster data dependency (e.g., cross-cluster data dependency between classes of clustering A, B, and/or C). In this example, as illustrated in FIG. 3 at 308, such refinement operations described above can be implemented to generate natural seam.

At 310, computer-implemented method 300 can comprise refining (e.g., via microservice generation system 102 and/or refinement component 206) clustering A, B, and/or C as depicted in FIG. 3 based on the static call graph (e.g., the filtered static call graph) generated at 302 as described above and using input from an entity (e.g., a human, a client, a user, a computing device, a software application, an agent, a machine learning (ML) model, an artificial intelligence (AI) model, etc.). For example, as illustrated in FIG. 3 at 310, refinement component 206 and/or the entity defined above can add classes (e.g., to clustering A, B, and/or C) that are missing in the runtime traces, where such classes have static call dependency (e.g., static call dependency with one or more classes in clustering A, B, and/or C as determined using the static call graph). In this example, as illustrated in FIG. 3 at 310, refinement component 206 and/or the entity defined above can further add classes (e.g., to clustering A, B, and/or C) with no call dependency to cluster (e.g., no static call dependency with one or more classes in clustering A, B, and/or C as determined using the static call graph). In this example, as illustrated in FIG. 3 at 310, such refinement operations described above can be implemented to generate business logic.

In an example, as illustrated in FIG. 3, the data dependency graph and/or the static call graph (e.g., the filtered static call graph) generated at 302 as described above can be provided to a user interface (UI) as a JSON file. In an example, as illustrated in FIG. 3, the runtime traces generated at 304 as described above can be provided to a user interface (UI) in the form of a runtime graph that can be formatted as a JSON file. In an example, as illustrated in FIG. 3, the natural seam and/or the business logic generated at 308 and 310, respective, as described above can be provided to a user interface (UI) as a JSON file.

FIG. 4 illustrates a diagram of an example, non-limiting model 400 that can facilitate generation of microservices from a monolithic application based on runtime traces in accordance with one or more embodiments described herein. Repetitive description of like elements and/or processes employed in respective embodiments is omitted for sake of brevity.

In some embodiments, model component 108 and/or second model component 204 can comprise model 400. For instance, as described above with reference to FIG. 1, model component 108 can comprise model 400, which can comprise a neural network that can be trained (e.g., via microservice generation system 102 as described above) to learn the cluster assignments and/or graph embeddings described above using the causal sequences of the one or more causal graphs described above.

As illustrated in FIG. 4, model 400 can comprise an input layer 402, an embedding layer 404, and/or an output layer 406. In the example trading application embodiment described above with reference to FIG. 1, input layer 402 can provide to embedding layer 404 a Java class (denoted as "MarketSummarySingleton" in FIG. 4) of a monolithic application in the form of an input vector as depicted in FIG. 4. Embedding layer 404 can produce one or more embeddings of the input Java class, where such one or more embeddings can comprise one or more vector representations of the input Java class. Based on such vector representation(s) of the input Java class, output layer 406, which can comprise a softmax classifier as illustrated in FIG. 4, can predict whether another class of the monolithic application is in a predefined window (e.g., a window size of 3 as denoted in the example trading application embodiment described above with reference to FIG. 1). For example, output layer 406 can predict whether a pair of Java classes in a monolithic application belong to the same window (denoted as "the neighborhood" in FIG. 4). For instance, in the example trading application embodiment described above with reference to FIG. 1 and as illustrated in FIG. 4, based on embedding layer 404 producing the vector representations of the input Java class denoted in FIG. 4 as "MarketSummarySingleton," output layer 406 can predict: a) the probability that the class "Log" is in the neighborhood (e.g., within a window size of 3 with respect to the input Java class "MarketSummarySingleton"); b) the probability that the class "TradeConfig" is in the neighborhood (e.g., within a window size of 3 with respect to the input Java class "MarketSummarySingleton"); c) the probability that the class "QuoteDataBeam" is in the neighborhood (e.g., within a window size of 3 with respect to the input Java class "MarketSummarySingleton"); and/or d) the probability that the class "TradeSLSBBeam" is in the neighborhood (e.g., within a window size of 3 with respect to the input Java class "MarketSummarySingleton").

Microservice generation system 102 can be associated with various technologies. For example, microservice generation system 102 can be associated with application modernization technologies, monolithic application technologies, monolithic enterprise application technologies, application programming technologies, cloud computing technologies, machine learning technologies, artificial intelligence technologies, and/or other technologies.

Microservice generation system 102 can provide technical improvements to systems, devices, components, operational steps, and/or processing steps associated with the various technologies identified above. For example, microservice generation system 102 can train a model to learn cluster assignments and/or graph embeddings of classes in a monolithic application based on runtime traces of business function test cases that can be executed using the monolithic application; and/or can further employ the model to generate clusters of the classes based on the cluster assignments and/or graph embeddings to identify one or more microservices of the monolithic application. Execution of such business function test cases using the monolithic application can yield runtime traces corresponding to each of such business function test cases. Microservice generation system 102 can utilize such runtime traces that correspond to respective business function test cases to generate causal graphs comprising causal sequences that also correspond to such respective business function test cases. Such causal graphs and/or causal sequences that correspond to respective business function test cases provide microservice generation system 102 with first order temporal dependencies and/or high order temporal dependencies of the monolithic application and/or the cluster assignments of the classes in the monolithic application, where such dependencies correspond to the respective business function test cases. These first order temporal dependencies and/or high order temporal dependencies provide microservice generation system 102 with the various business functionalities of the monolithic application such as, for instance, the order and frequency of how classes and function calls of the monolithic application interact. The first order temporal dependencies and/or the high order temporal dependencies can further enable microservice generation system 102 to associate business context with each trace to provide improved functional grouping (e.g., functional clustering) of the classes in the monolithic application. Such improved functional grouping of the classes in the monolithic application can enable microservice generation system 102 to more accurately identify one or more microservices of the monolithic application, thereby facilitating improved application modernization of the monolithic application by microservice generation system 102.

Microservice generation system 102 can provide technical improvements to a processing unit (e.g., processor 106) associated with a classical computing device and/or a quantum computing device (e.g., a quantum processor, quantum hardware, superconducting circuit, etc.) associated with microservice generation system 102. For example, by improving functional grouping (e.g., functional clustering) of the classes in a monolithic application, which can enable microservice generation system 102 to more accurately identify one or more microservices of the monolithic application as described above, microservice generation system 102 can reduce the workload of a processor (e.g., processor 106) utilized to execute application modernization of the monolithic application (e.g., by reducing the number of processing cycles such a processor performs to complete the application modernization process). Such reduced workload of such a processor (e.g., processor 106) can improve processing performance and/or processing efficiency of such a processor and/or can further reduce computational costs of such a processor.

A practical application of microservice generation system 102 is that it can be implemented to perform an improved application modernization process on a monolithic application. For example, a practical application of microservice generation system 102 is that it can be implemented by an owner of a monolithic application (e.g., a monolith enterprise application) to quickly and accurately identify microservices of the monolithic application, thereby enabling an improved application modernization process on the monolithic application.

It should be appreciated that microservice generation system 102 provides a new approach driven by relatively new application modernization technologies that currently involve making assumptions of a certain design or programming models associated with a monolithic application and/or involve manually-intensive input from a human to perform an application modernization process on the monolithic application. For example, microservice generation system 102 provides a new automated approach to perform application modernization on a monolithic application without manually-intensive input from a human to: define such assumptions of a certain design or programming models associated with the monolithic application; identify classes and/or clusters of classes in the monolithic application that can constitute potential microservice candidates of the monolithic application; and/or refine such potential microservice candidates to identify the microservices of the monolithic application that can comprise and/or be implemented as standalone applications of the monolithic application.

Microservice generation system 102 can employ hardware or software to solve problems that are highly technical in nature, that are not abstract and that cannot be performed as a set of mental acts by a human. In some embodiments, one or more of the processes described herein can be performed by one or more specialized computers (e.g., a specialized processing unit, a specialized classical computer, a specialized quantum computer, etc.) to execute defined tasks related to the various technologies identified above. Microservice generation system 102 and/or components thereof, can be employed to solve new problems that arise through advancements in technologies mentioned above, employment of quantum computing systems, cloud computing systems, computer architecture, and/or another technology.

It is to be appreciated that microservice generation system 102 can utilize various combinations of electrical components, mechanical components, and circuitry that cannot be replicated in the mind of a human or performed by a human, as the various operations that can be executed by microservice generation system 102 and/or components thereof as described herein are operations that are greater than the capability of a human mind. For instance, the amount of data processed, the speed of processing such data, or the types of data processed by microservice generation system 102 over a certain period of time can be greater, faster, or different than the amount, speed, or data type that can be processed by a human mind over the same period of time.

According to several embodiments, microservice generation system 102 can also be fully operational towards performing one or more other functions (e.g., fully powered on, fully executed, etc.) while also performing the various operations described herein. It should be appreciated that such simultaneous multi-operational execution is beyond the capability of a human mind. It should also be appreciated that microservice generation system 102 can include information that is impossible to obtain manually by an entity, such as a human user. For example, the type, amount, and/or variety of information included in microservice generation system 102, model component 108, cluster component 110, collection component 202, second model component 204, refinement component 206, and/or model 400 can be more complex than information obtained manually by a human user.

Figure 5:
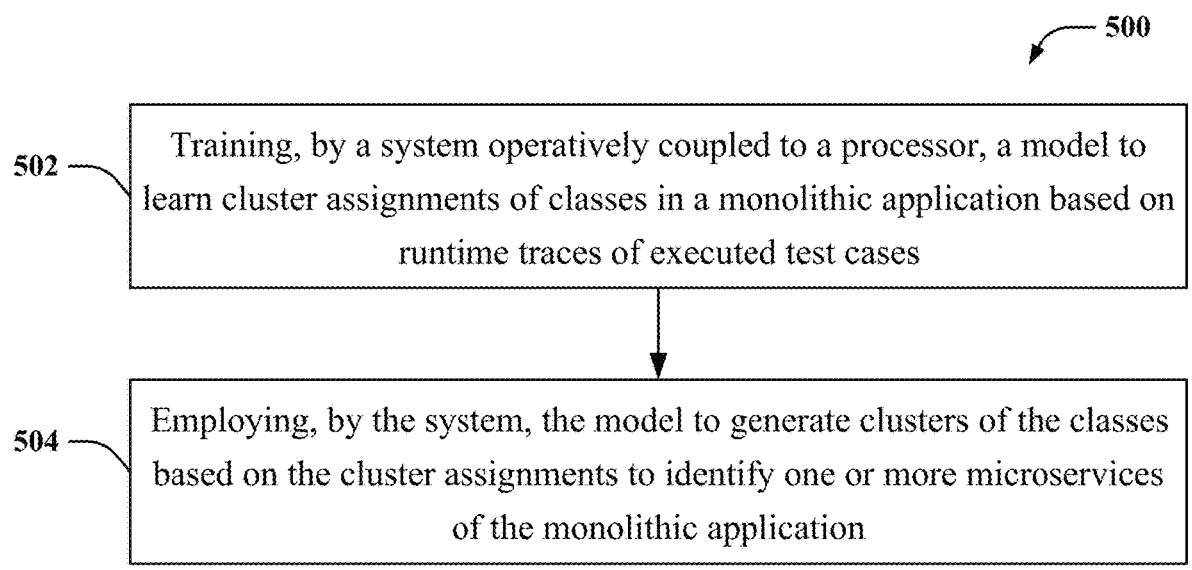
FIG. 5 illustrates a flow diagram of an example, non-limiting computer-implemented method that can facilitate generation of microservices from a monolithic application based on runtime traces in accordance with one or more embodiments described herein.

FIG. 5 illustrates a flow diagram of an example, non-limiting computer-implemented method 500 that can facilitate generation of microservices from a monolithic application based on runtime traces in accordance with one or more embodiments described herein. Repetitive description of like elements and/or processes employed in respective embodiments is omitted for sake of brevity.

At 502, computer-implemented method 500 can comprise training, by a system (e.g., via microservice generation system 102) operatively coupled to a processor (e.g., processor 106, a quantum processor, etc.), a model (e.g., model component 108, model 400, etc.) to learn cluster assignments of classes (e.g., cluster assignments and/or graph embeddings of Java classes) in a monolithic application (e.g., a monolith enterprise application) based on runtime traces (e.g., the runtime traces described above with reference to FIGS. 1 and 3) of executed test cases (e.g., business function test cases executed using the monolithic application).

At 504, computer-implemented method 500 can comprise employing, by the system (e.g., via microservice generation system 102 and/or cluster component 110), the model to generate clusters of the classes based on the cluster assignments to identify one or more microservices of the monolithic application.

Figure 6:
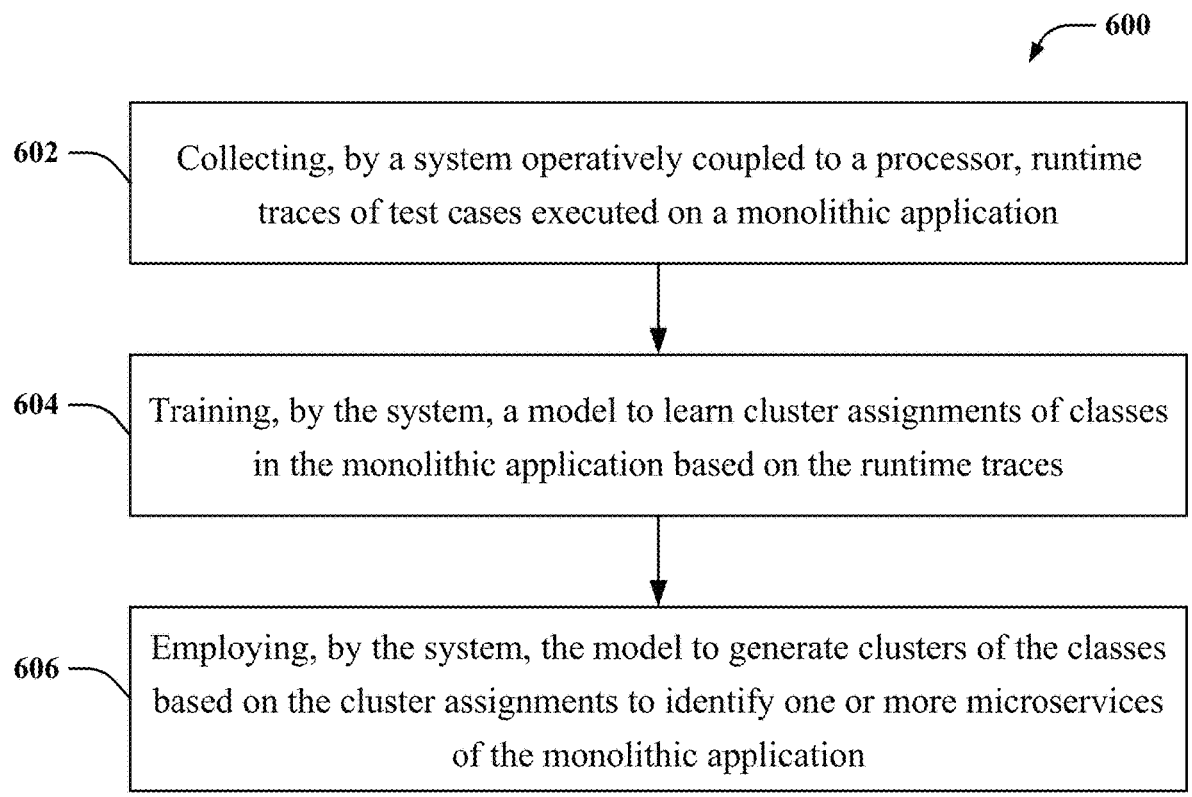
FIG. 6 illustrates a flow diagram of an example, non-limiting computer-implemented method that can facilitate generation of microservices from a monolithic application based on runtime traces in accordance with one or more embodiments described herein.

FIG. 6 illustrates a flow diagram of an example, non-limiting computer-implemented method 600 that can facilitate generation of microservices from a monolithic application based on runtime traces in accordance with one or more embodiments described herein. Repetitive description of like elements and/or processes employed in respective embodiments is omitted for sake of brevity.

At 602, computer-implemented method 600 can comprise collecting, by a system (e.g., via microservice generation system 102 and/or collection component 202) operatively coupled to a processor (e.g., processor 106, a quantum processor, etc.), runtime traces (e.g., the runtime traces described above with reference to FIGS. 1 and 3) of test cases executed on a monolithic application (e.g., business function test cases executed using a monolithic application such as, for instance, a monolith enterprise application).

At 604, computer-implemented method 600 can comprise training, by the system (e.g., via microservice generation system 102), a model (e.g., model component 108, model 400, etc.) to learn cluster assignments of classes (e.g., cluster assignments and/or graph embeddings of Java classes) in the monolithic application based on the runtime traces.

At 606, computer-implemented method 600 can comprise employing, by the system (e.g., via microservice generation system 102 and/or cluster component 110), the model to generate clusters of the classes based on the cluster assignments to identify one or more microservices of the monolithic application.

Figure 7:
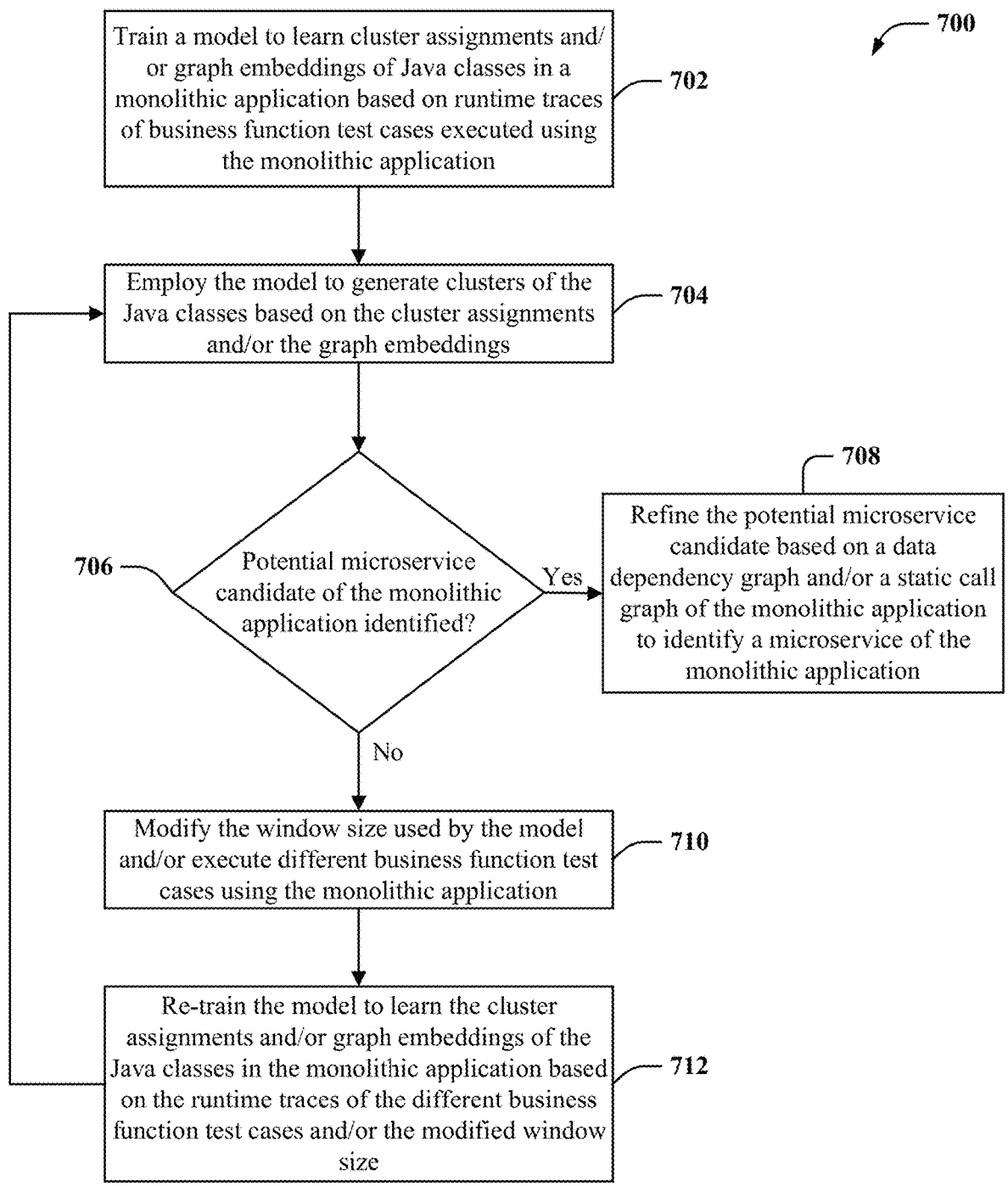
FIG. 7 illustrates a flow diagram of an example, non-limiting computer-implemented method that can facilitate generation of microservices from a monolithic application based on runtime traces in accordance with one or more embodiments described herein.

FIG. 7 illustrates a flow diagram of an example, non-limiting computer-implemented method 700 that can facilitate generation of microservices from a monolithic application based on runtime traces in accordance with one or more embodiments described herein. Repetitive description of like elements and/or processes employed in respective embodiments is omitted for sake of brevity.

At 702, computer-implemented method 700 can comprise training (e.g., via microservice generation system 102) a model (e.g., model component 108, model 400, etc.) to learn cluster assignments and/or graph embeddings of Java classes in a monolithic application (e.g., a monolith enterprise application) based on runtime traces (e.g., the runtime traces described above with reference to FIGS. 1 and 3) of business function test cases executed using the monolithic application.

At 704, computer-implemented method 700 can comprise employing (e.g., via microservice generation system 102 and/or cluster component 110) the model to generate clusters of the Java classes based on the cluster assignments and/or the graph embeddings.

At 706, computer-implemented method 700 can comprise determining (e.g., via microservice generation system 102, model component 108, and/or cluster component 110) whether one or more potential microservice candidates of the monolithic application are identified. For example, with reference to FIG. 1 and the example trading application described above, cluster component 110 can employ the trained version of model component 108 to generate one or more positive sample pairs from causal sequences, where such one or more positive sample pairs can constitute one or more potential microservice candidates of the monolithic application.

If it is determined at 706 that one or more potential microservice candidates of the monolithic application are identified, at 708, computer-implemented method 700 can comprise refining (e.g., via refinement component 206) the one or more potential microservice candidates based on a data dependency graph and/or a static call graph of the monolithic application (e.g., the data dependency graph and/or the static call graph described above with reference to FIGS. 1, 2, and/or 3) to identify a microservice of the monolithic application.

If it is determined at 706 that one or more potential microservice candidates of the monolithic application are not identified, at 710, computer-implemented method 700 can comprise modifying (e.g., via microservice generation system 102 and/or model component 108) the window size used by the model (e.g., the window size described above with reference to FIG. 1 that can be used to generate the one or more positive sample pairs that can constitute the one or more potential microservice candidates of the monolithic application) and/or executing (e.g., via microservice generation system 102 and/or collection component 202) different business function test cases using the monolithic application (e.g., business function test cases other than those described above with reference to FIG. 1). For example, at 710, computer-implemented method 700 can comprise modifying the window size used by the model from a window size of 3, for instance, to a window size of 4, for instance.

At 712, computer-implemented method 700 can comprise re-training (e.g., via microservice generation system 102) the model to learn the cluster assignments and/or graph embeddings of the Java classes in the monolithic application based on the runtime traces of the different business function test cases executed at 710 and/or the modified window size.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 8:
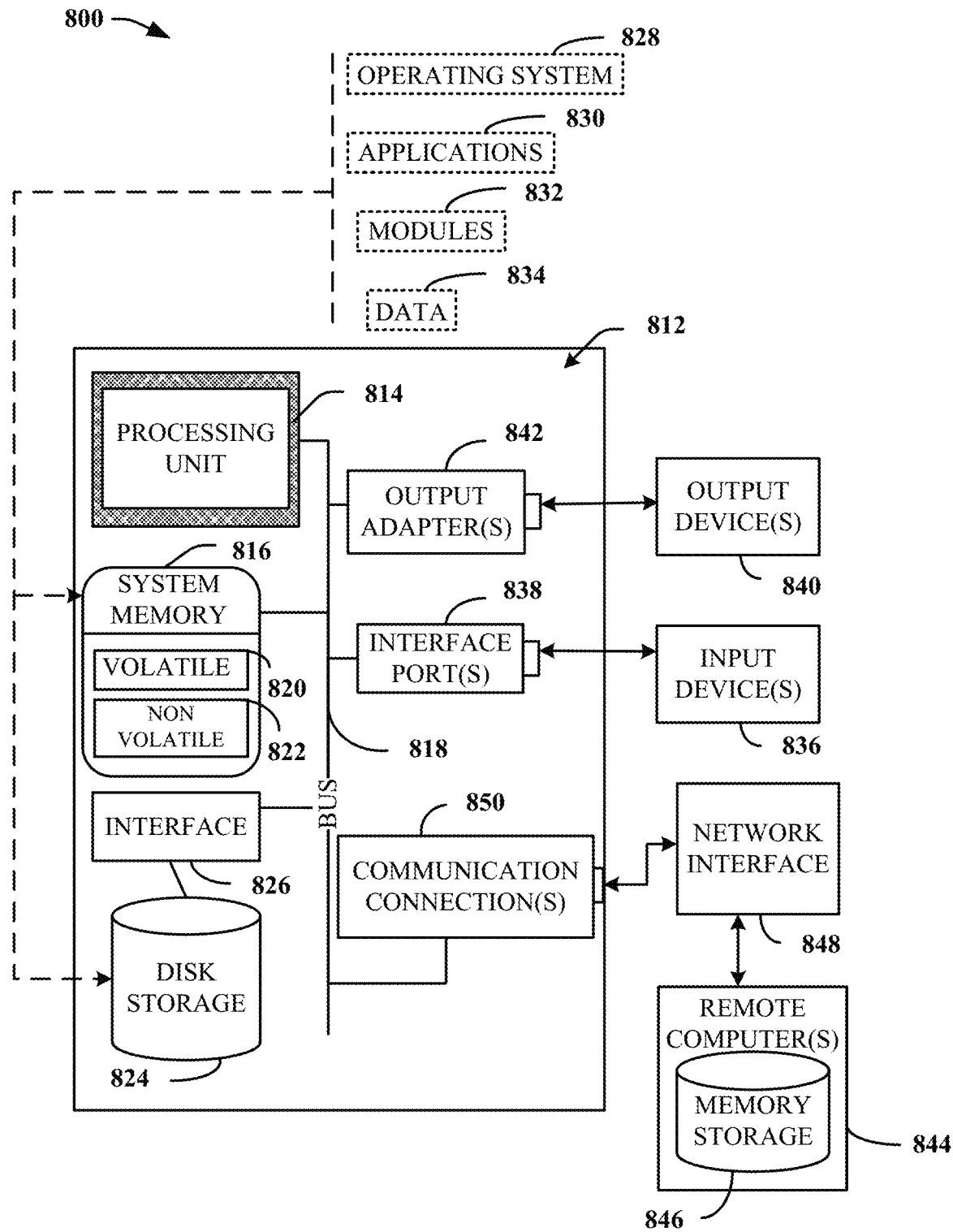
FIG. 8 illustrates a block diagram of an example, non-limiting operating environment in which one or more embodiments described herein can be facilitated.

In order to provide a context for the various aspects of the disclosed subject matter, FIG. 8 as well as the following discussion are intended to provide a general description of a suitable environment in which the various aspects of the disclosed subject matter can be implemented. FIG. 8 illustrates a block diagram of an example, non-limiting operating environment in which one or more embodiments described herein can be facilitated. Repetitive description of like elements employed in other embodiments described herein is omitted for sake of brevity.

With reference to FIG. 8, a suitable operating environment 800 for implementing various aspects of this disclosure can also include a computer 812. The computer 812 can also include a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814. The system bus 818 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 816 can also include volatile memory 820 and nonvolatile memory 822. The basic input/output system (BIOS), containing the basic routines to transfer information between elements within the computer 812, such as during start-up, is stored in nonvolatile memory 822. Computer 812 can also include removable/non-removable, volatile/non-volatile computer storage media. FIG. 8 illustrates, for example, a disk storage 824. Disk storage 824 can also include, but is not limited to, devices like a magnetic disk drive, floppy disk drive, tape drive, Jaz drive, Zip drive, LS-100 drive, flash memory card, or memory stick. The disk storage 824 also can include storage media separately or in combination with other storage media. To facilitate connection of the disk storage 824 to the system bus 818, a removable or non-removable interface is typically used, such as interface 826. FIG. 8 also depicts software that acts as an intermediary between users and the basic computer resources described in the suitable operating environment 800. Such software can also include, for example, an operating system 828. Operating system 828, which can be stored on disk storage 824, acts to control and allocate resources of the computer 812.

System applications 830 take advantage of the management of resources by operating system 828 through program modules 832 and program data 834, e.g., stored either in system memory 816 or on disk storage 824. It is to be appreciated that this disclosure can be implemented with various operating systems or combinations of operating systems. A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port can be used to provide input to computer 812, and to output information from computer 812 to an output device 840. Output adapter 842 is provided to illustrate that there are some output devices 840 like monitors, speakers, and printers, among other output devices 840, which require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a computer, a server, a router, a network PC, a workstation, a microprocessor based appliance, a peer device or other common network node and the like, and typically can also include many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 850 refers to the hardware/software employed to connect the network interface 848 to the system bus 818. While communication connection 850 is shown for illustrative clarity inside computer 812, it can also be external to computer 812. The hardware/software for connection to the network interface 848 can also include, for exemplary purposes only, internal and external technologies such as, modems including regular telephone grade modems, cable modems and DSL modems, ISDN adapters, and Ethernet cards.

Figure 9:
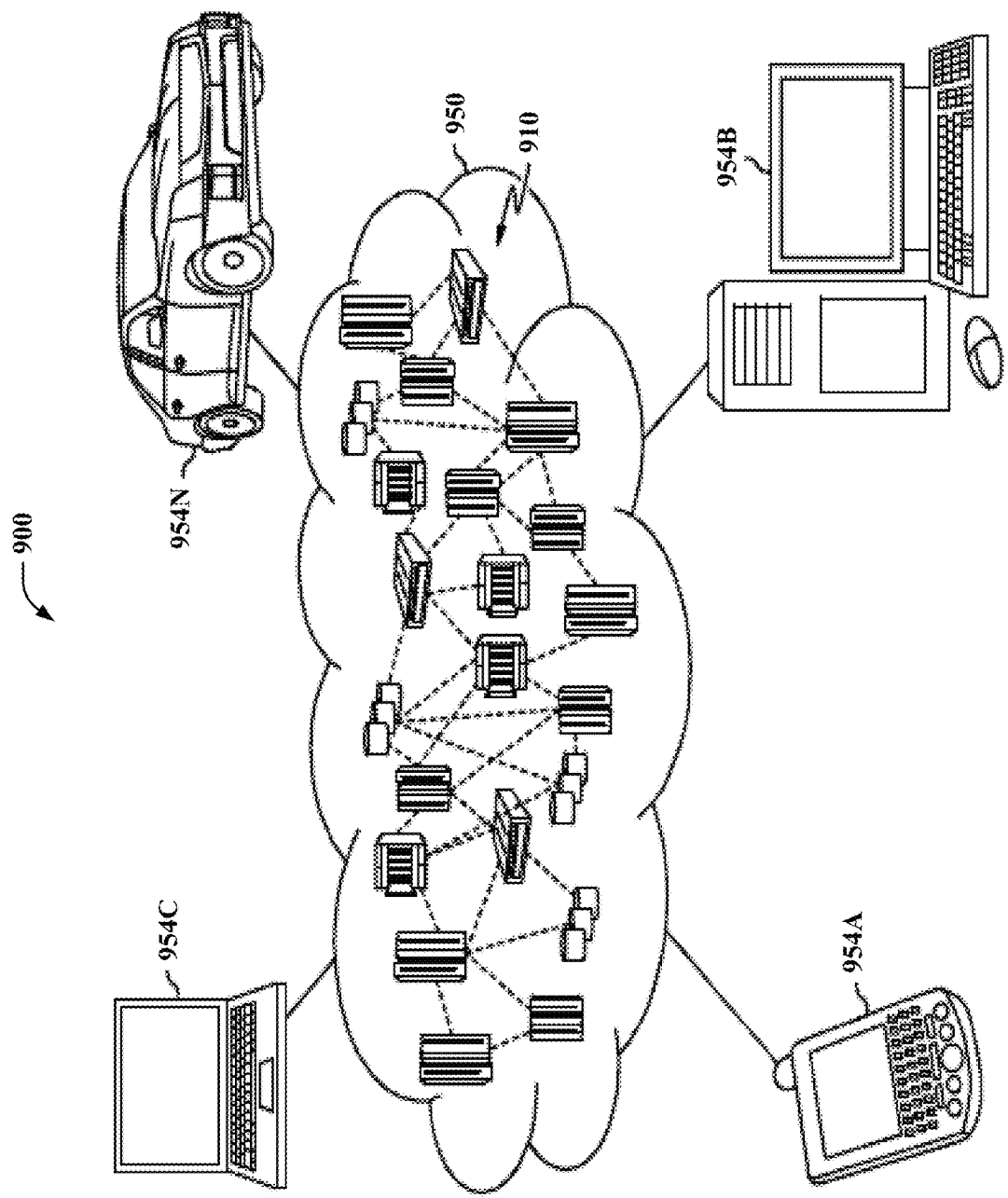
FIG. 9 illustrates a block diagram of an example, non-limiting cloud computing environment in accordance with one or more embodiments of the subject disclosure.

Referring now to FIG. 9, an illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Although not illustrated in FIG. 9, cloud computing nodes 910 can further comprise a quantum platform (e.g., quantum computer, quantum hardware, quantum software, etc.) with which local computing devices used by cloud consumers can communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
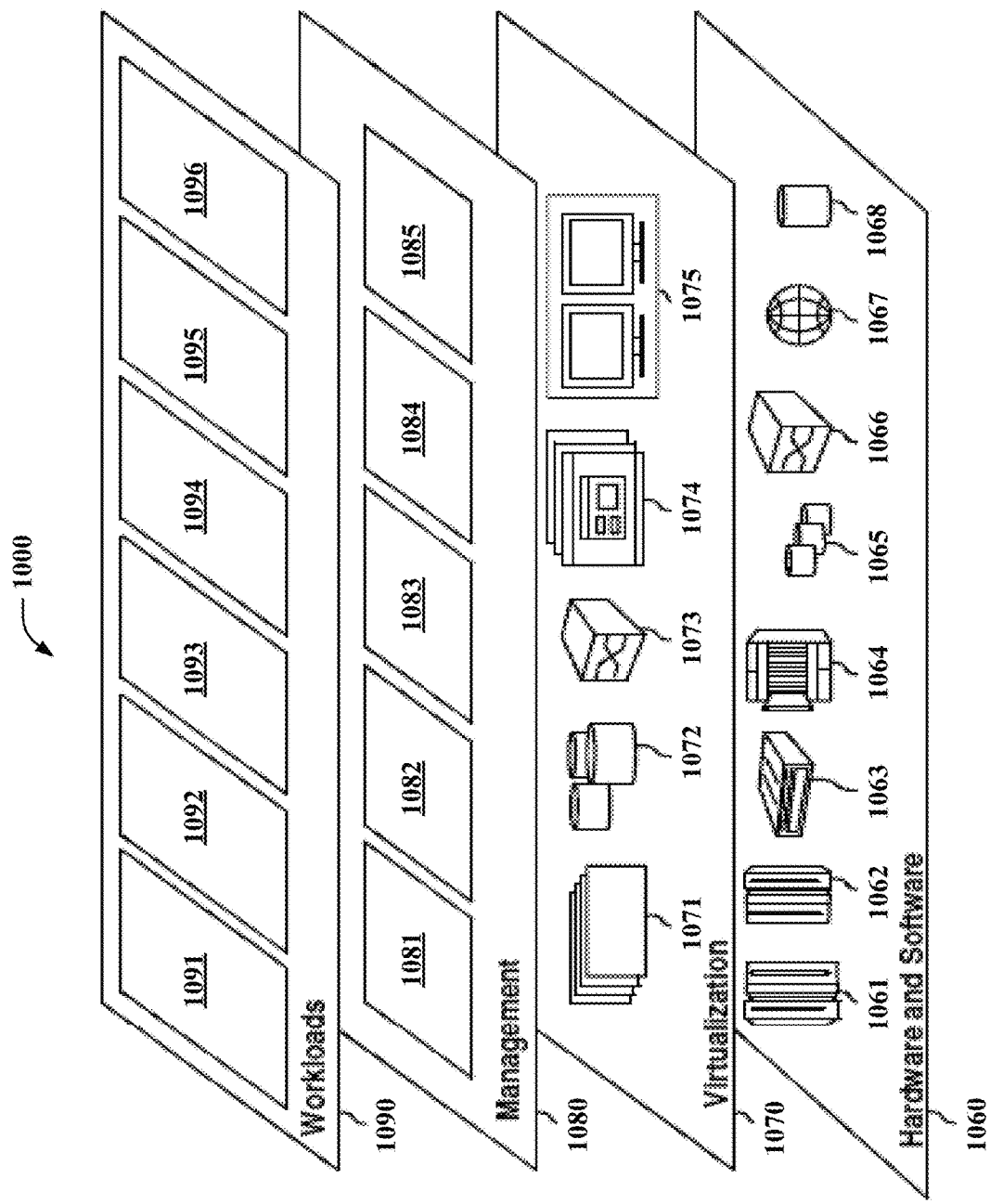
FIG. 10 illustrates a block diagram of example, non-limiting abstraction model layers in accordance with one or more embodiments of the subject disclosure.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067, database software 1068, quantum platform routing software (not illustrated in FIG. 10), and/or quantum software (not illustrated in FIG. 10).

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Non-limiting examples of workloads and functions which may be provided from this layer include: mapping and navigation 1091; software development and lifecycle management 1092; virtual classroom education delivery 1093; data analytics processing 1094; transaction processing 1095; and microservice generation software 1096.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a standalone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on standalone computers. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAIVI), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer executable components; and
   a processor that executes the computer executable components stored in the memory, wherein the computer executable components comprise:
      a collection component that labels runtime traces of business function test cases executed on a monolithic application with respective business contexts resulting in business context labeled runtime traces; and
      a refinement component that generates a group of microservices from the monolithic application based on the business context labeled runtime traces.

2. The system of claim 1, wherein the refinement component refines one or more microservices of the group of microservices based on data dependency of the monolithic application.

3. The system of claim 1, wherein the refinement component refines one or more microservices of the group of microservices based on a static call graph of the monolithic application.

4. The system of claim 1, wherein the computer executable components further comprise:
   a model component that generates a causal graph based on the business context labeled runtime traces that captures temporal dependencies in the business context labeled runtime traces.

5. The system of claim 4, wherein the refinement component refines one or more microservices of the group of microservices based on the causal graph.

6. The system of claim 4, wherein the temporal dependencies comprise at least one of first order temporal dependencies or high order temporal dependencies.

7. The system of claim 1, wherein the computer executable components further comprise:
   a cluster component that cluster classes in the monolithic application based on the business context labeled runtime traces.

8. A computer-implemented method, comprising:
   labeling, by a system operatively coupled to a processor, runtime traces of business function test cases executed on a monolithic application with respective business contexts resulting in business context labeled runtime traces; and
   generating, by the system, a group of microservices from the monolithic application based on the business context labeled runtime traces.

9. The computer-implemented method of claim 8, further comprising:
   refining, by the system, one or more microservices of the group of microservices based on data dependency of the monolithic application.

10. The computer-implemented method of claim 8, further comprising:
    refining, by the system, one or more microservices of the group of microservices based on a static call graph of the monolithic application.

11. The computer-implemented method of claim 8, further comprising:
    generating, by the system, a causal graph based on the business context labeled runtime traces that captures temporal dependencies in the business context labeled runtime traces.

12. The computer-implemented method of claim 11, further comprising:
    refining, by the system, one or more microservices of the group of microservices based on based on the causal graph.

13. The computer-implemented method of claim 11, wherein the temporal dependencies comprise at least one of first order temporal dependencies or high order temporal dependencies.

14. The computer-implemented method of claim 8, further comprising:
    clustering, by the system, classes in the monolithic application based on the business context labeled runtime traces.

15. A computer program product facilitating a process to generate microservices, the computer program product comprising a computer readable storage medium having program instructions embodied therewith, the program instructions executable by a processor to cause the processor to:
    label, by the processor, runtime traces of business function test cases executed on a monolithic application with respective business contexts resulting in business context labeled runtime traces; and
    generate, by the processor, a group of microservices from the monolithic application based on the business context labeled runtime traces.

16. The computer program product of claim 15, wherein the program instructions are further executable by the processor to cause the processor to:
    refine, by the processor, one or more microservices of the group of microservices based on data dependency of the monolithic application.

17. The computer program product of claim 15, wherein the program instructions are further executable by the processor to cause the processor to:
    refine, by the processor, one or more microservices of the group of microservices based on a static call graph of the monolithic application.

18. The computer program product of claim 15, wherein the program instructions are further executable by the processor to cause the processor to:
    generate, by the processor, a causal graph based on the business context labeled runtime traces that captures temporal dependencies in the business context labeled runtime traces.

19. The computer program product of claim 18, wherein the program instructions are further executable by the processor to cause the processor to:
    refine, by the processor, one or more microservices of the group of microservices based on the causal graph.

20. The computer program product of claim 18, wherein the temporal dependencies comprise at least one of first order temporal dependencies or high order temporal dependencies.

* * * * *